United States Patent
Nomura

(10) Patent No.: US 12,522,131 B2
(45) Date of Patent: Jan. 13, 2026

(54) VEHICLE CONTROL DEVICE

(71) Applicant: TOYOTA JIDOSHA KABUSHIKI KAISHA, Toyota (JP)

(72) Inventor: Shin Nomura, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/968,962

(22) Filed: Dec. 4, 2024

(65) Prior Publication Data

US 2025/0269786 A1    Aug. 28, 2025

(30) Foreign Application Priority Data

Feb. 27, 2024    (JP) .................................. 2024-027236

(51) Int. Cl.
*B60Q 1/14*    (2006.01)

(52) U.S. Cl.
CPC .......... *B60Q 1/143* (2013.01); *B60Q 2300/45* (2013.01)

(58) Field of Classification Search
CPC .................................................... B60Q 1/143
See application file for complete search history.

(56) References Cited

U.S. PATENT DOCUMENTS

| | | | |
|---|---|---|---|
| 8,355,851 B2 | 1/2013 | Inoue et al. | |
| 8,370,040 B2 | 2/2013 | Inoue et al. | |
| 8,417,430 B2 | 4/2013 | Saeki | |
| 8,548,709 B2 | 10/2013 | Morita | |
| 8,768,597 B2 | 7/2014 | Kagawa | |
| 9,174,643 B2 | 11/2015 | Aso | |
| 10,017,178 B2 | 7/2018 | Morimoto et al. | |
| 10,118,617 B2* | 11/2018 | Urano | B60W 10/20 |
| 10,486,698 B2 | 11/2019 | Masui et al. | |
| 2005/0201590 A1* | 9/2005 | Kudo | G08G 1/167 382/104 |
| 2017/0364629 A1* | 12/2017 | Tarte | B60Q 1/143 |
| 2018/0297511 A1* | 10/2018 | Park | B60Q 1/143 |
| 2019/0241188 A1* | 8/2019 | Tsuchiya | B60W 30/18163 |
| 2019/0295419 A1 | 9/2019 | Tosa et al. | |
| 2020/0012295 A1* | 1/2020 | Kim | G06Q 10/0631 |
| 2020/0207254 A1* | 7/2020 | Iriba | F21S 41/365 |
| 2020/0290599 A1* | 9/2020 | Noguchi | B60W 10/04 |
| 2020/0333182 A1* | 10/2020 | Ahmed | G01J 1/4257 |
| 2021/0178959 A1* | 6/2021 | Ishida | B60Q 1/085 |
| 2023/0150418 A1* | 5/2023 | Zhou | G01S 17/89 362/466 |

FOREIGN PATENT DOCUMENTS

| | | |
|---|---|---|
| JP | 2001-233119 A | 8/2001 |
| JP | 2002-002370 A | 1/2002 |
| JP | 2021-051687 A | 4/2021 |

* cited by examiner

*Primary Examiner* — Bryon T Gyllstrom
(74) *Attorney, Agent, or Firm* — SoraIP, Inc.

(57) ABSTRACT

A vehicle control device capable of executing automatic takeoff control for automatically starting a own vehicle, the vehicle control device comprising: an object body determination unit that determines whether or not an object body that is to cross a front side of the own vehicle has been detected while the own vehicle is stopped; and a vehicle control unit that executes headlight-flashing of the own vehicle and suspends automatic takeoff of the own vehicle when the object body is detected.

3 Claims, 3 Drawing Sheets

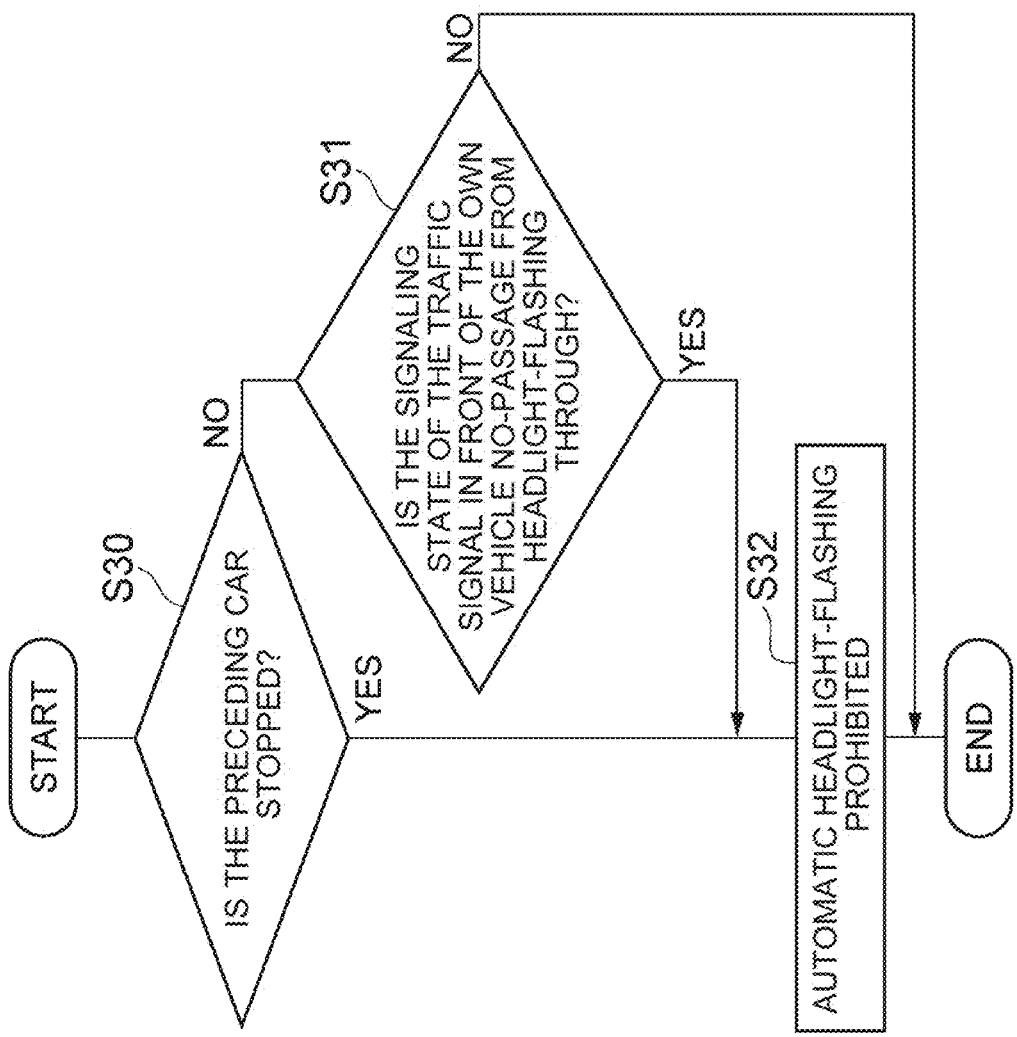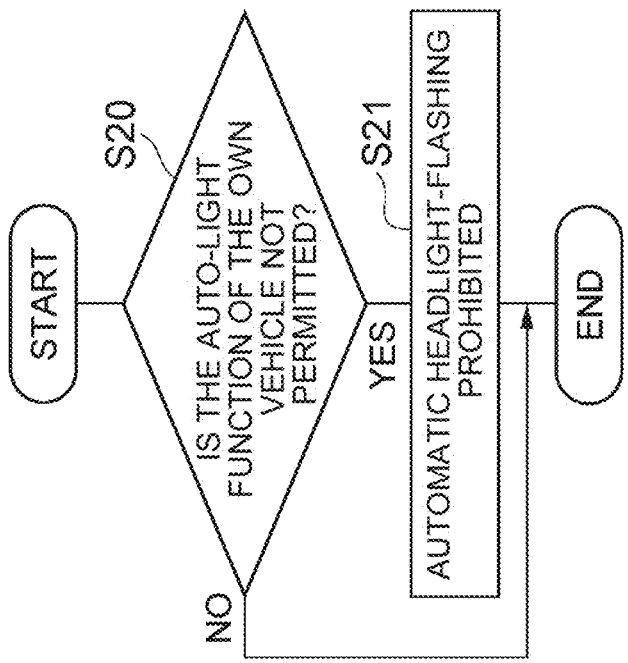

VEHICLE CONTROL DEVICE

CROSS-REFERENCE TO RELATED APPLICATION

This application claims priority to Japanese Patent Application No. 2024-027236 filed on Feb. 27, 2024, incorporated herein by reference in its entirety.

BACKGROUND

1. Technical Field

The disclosure relates to a vehicle control device.

2. Description of Related Art

Japanese Unexamined Patent Application Publication No. 2002-002370 (JP 2002-002370 A) is conventionally known as a technical document related to a vehicle control device. This publication describes a headlamp control device that, when a headlamp of a vehicle is in an off state, automatically turns on the headlamp when the vehicle starts traveling from a stopped state.

SUMMARY

In recent years, there has been known a vehicle control device capable of executing automatic takeoff control that, when a vehicle stopped on a road satisfies a predetermined condition, automatically performs takeoff of the vehicle. Now, there are cases in which a lighting device of a stopped vehicle is operated in order to convey to other vehicles or pedestrians in the surroundings what sort of behavior the own vehicle is going to undertake. However, causing the driver to convey the behavior of the vehicle to the surroundings, up to the time when determination of takeoff of the vehicle is automatically performed by the automatic takeoff control, places a burden on the driver.

According to an aspect of the disclosure, there is provided a vehicle control device that is configured to execute automatic takeoff control for performing automatic takeoff of an own vehicle, the vehicle control device including an object body determination unit for determining whether an object body that is attempting to cross in front of the own vehicle has been detected, while the own vehicle is stopped, and a vehicle control unit that executes headlight-flashing of the own vehicle, and also and suspends automatic takeoff of the own vehicle, when the object body is detected.

According to the vehicle control device of the aspect of the disclosure, when an object body is detected that is attempting to cross in front of the own vehicle that is stopped, the headlight-flashing of the own vehicle is automatically executed, and also the automatic takeoff of the own vehicle is suspended. Thus, the behavior of the own vehicle can be conveyed to other vehicles and pedestrians in the surroundings, while reducing the burden on the driver, as compared to the driver performing the headlight-flashing operation.

The vehicle control device according to an aspect of the disclosure further includes a traffic signal recognition unit that recognizes a signaling state of a traffic signal in front of the own vehicle while the own vehicle is stopped, in which even when the object body is detected, the vehicle control unit does not have to execute headlight-flashing of the own vehicle when the signaling state of the traffic signal is a no-passage state.

In the vehicle control device according to an aspect of the disclosure, even when the object body is detected, the vehicle control unit does not have to perform headlight-flashing of the own vehicle when a preceding vehicle is stopped in front of the own vehicle.

In the vehicle control device according to an aspect of the disclosure, even when the object body is detected, the vehicle control unit does not have to execute headlight-flashing of the own vehicle when an auto-light function of the own vehicle is not permitted.

According to each aspect of the disclosure, the behavior of the own vehicle can be conveyed to other vehicles and pedestrians in the surroundings, while reducing the burden on the driver.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3A is a flow chart illustrating an example of a first automatic headlight-flashing prohibition process; and FIG. 3B is a flow chart illustrating an example of a second automatic headlight-flashing prohibition process.

DETAILED DESCRIPTION OF EMBODIMENTS

Hereinafter, embodiments of the present disclosure will be described with reference to the drawings.

Figure 1:
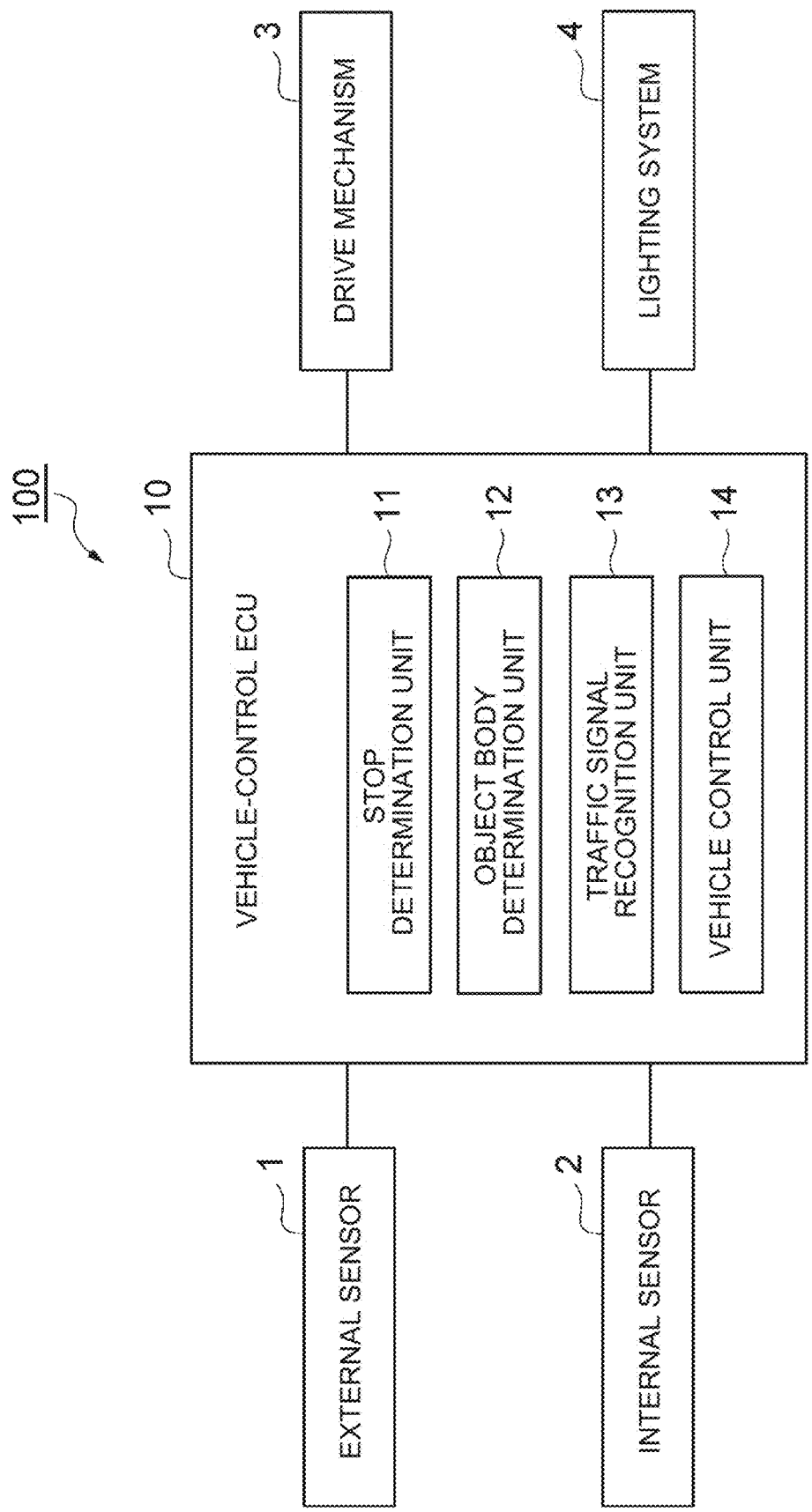
FIG. 1 is a block diagram illustrating a vehicle control device according to an embodiment.

FIG. 1 is a block diagram illustrating a vehicle control device 100 according to an embodiment. The vehicle control device 100 illustrated in FIG. 1 is mounted on a vehicle such as a passenger car, and is a device that controls traveling of the vehicle and controls a light device. Hereinafter, the vehicle on which the vehicle control device 100 is mounted is referred to as an own vehicle.

Configuration of Vehicle Control Device

Hereinafter, a configuration of the vehicle control device 100 according to the present embodiment will be described with reference to the drawings. As illustrated in FIG. 1, the vehicle control device 100 includes a vehicle control electronic control unit (ECU) 10 that comprehensively manages the device. The vehicle-control ECU 10 is an electronic control unit having a central processing unit (CPU) and a storage unit. The storage unit includes, for example, read only memory (ROM), random access memory (RAM), and electrically erasable programmable read-only memory (EEPROM). In the vehicle control ECU 10, for example, various functions are realized by executing a program stored in the storage unit by a CPU. The vehicle control ECU 10 may include a plurality of electronic units. The vehicle control ECU 10 is connected with an external sensor 1, an internal sensor 2, a drive mechanism 3, and a lighting device mechanism 4.

The external sensor 1 is a detection device that detects a situation around the own vehicle. The external sensor 1 includes at least one of a camera and a radar sensor.

The camera is an imaging device that captures an image of an external state of the own vehicle. The camera is provided, for example, on a rear side of a windshield of the own vehicle, and images a front side of the own vehicle. The cameras transmit captured images regarding external conditions of the own vehicle to the vehicle control ECU 10. The radar sensor is a detection device that detects an object around the own vehicle using radio waves (for example, millimeter waves) or light. The radar sensor includes, for example, a millimeter-wave radar or a light detection and ranging (LiDAR). The radar sensor transmits information of the detected object to the vehicle control ECU 10.

The internal sensor 2 is a detection device that detects a traveling state of the own vehicle. The internal sensor 2 includes a vehicle speed sensor and an acceleration sensor. The vehicle speed sensor is a detector that detects the speed of the own vehicle. The acceleration sensor is a detector that detects acceleration of the own vehicle. The internal sensor 2 may include a yaw rate sensor. The internal sensor 2 transmits the detected vehicle speed and the like to the vehicle control ECU 10.

The drive mechanism 3 is a device used for controlling the own vehicle. The drive mechanism 3 includes at least a drive actuator, a brake actuator, and a steering actuator. The driving actuator controls the amount of air supplied to the engine (throttle opening) in response to a control signal from the vehicle control ECU 10 to control the driving force of the own vehicle. When the own vehicle is in hybrid electric vehicle (HEV), the driving force is controlled by inputting a control signal from the vehicle control ECU 10 to a motor as a power source in addition to the air-supply amount to the engine. When the own vehicle is battery electric vehicle (BEV), a control signal from a vehicle control ECU 10 is inputted to a motor as a power source, and the driving force is controlled.

The brake actuator controls the brake system in response to a control signal from the vehicle control ECU 10, and controls a braking force applied to wheels of the own vehicle. As the brake system, for example, a hydraulic brake system can be used. The steering actuator controls driving of an assist motor for controlling the steering torque in the electric power steering system in response to a control signal from the vehicle control ECU 10. Thus, the steering actuator controls the steering torque of the own vehicle.

The lighting device mechanism 4 is a mechanism including a lighting device such as a headlight of the own vehicle. The lighting device mechanism 4 executes an auto-light function, a headlight-flashing function, and the like in response to a control signal from the vehicle control ECU 10.

Next, a functional configuration of the vehicle control ECU 10 will be described. As illustrated in FIG. 1, the vehicle control ECU 10 includes a stop determination unit 11, an object body determination unit 12, a traffic signal recognition unit 13, and a vehicle control unit 14.

The stop determination unit 11 determines whether or not the own vehicle is stopped based on the detection result of the internal sensor 2. For example, when the vehicle speed of the own vehicle is less than the stop threshold, the stop determination unit 11 determines that the own vehicle is stopped. The stop threshold is set to an appropriate value for the stop determination.

The object body determination unit 12 determines whether or not an object body that is going to cross the front of the own vehicle is detected while the own vehicle is stopped. The object body is another vehicle that crosses the front of the own vehicle by a right turn or the like, or a pedestrian that crosses the front of the own vehicle. The object body determination unit 12 determines whether or not the object body has been detected based on the detection result of the external sensor 1 (the detection result of the radar sensor or the captured image of the camera).

The traffic signal recognition unit 13 recognizes the signaling state of the traffic signal in front of the own vehicle based on the detection result of the external sensor 1 (for example, the captured image of the camera). The traffic signal recognition unit 13 recognizes whether the signaling state of the traffic signal is a passage permitted state (for example, a blue signal) or a no-passage state (for example, a red signal). Note that the vehicle control ECU 10 does not necessarily have to include the traffic signal recognition unit 13.

The vehicle control unit 14 executes the automatic takeoff of the own vehicle when the automatic takeoff condition is satisfied while the own vehicle is stopped in a case where the driver is permitted to control the automatic takeoff of the own vehicle. The automatic takeoff condition is a preset condition. The automatic takeoff condition includes, for example, a condition in which the driver separates the foot from the brake pedal, a condition in which the preceding vehicle in front of the driver has started, a condition in which the driver holds the steering wheel, and the like. The automatic takeoff condition is not limited to the above-described content, and a well-known condition relating to the automatic takeoff can be adopted. The vehicle control unit 14 performs automatic takeoff the own vehicle by transmitting a control signal to the drive mechanism 3.

When an object body to be crossed in front of the own vehicle is detected while the own vehicle is stopped, the vehicle control unit 14 executes automatic headlight-flashing of the own vehicle and suspends automatic takeoff of the own vehicle. The vehicle control unit 14 transmits a control signal to the lighting device mechanism 4 to perform headlight-flashing by the headlight of the own vehicle. As a result, the own vehicle can inform the surrounding other vehicles and pedestrians that there is no intention for takeoff. Note that the suspension of the automatic takeoff may be a mode in which the automatic takeoff is temporarily prohibited by detection of the object body, or a mode in which the automatic takeoff condition is not satisfied by detection of the object body.

When the auto-light function of the own vehicle is not permitted, the vehicle control unit 14 may prohibit the automatic headlight-flashing. The auto-light function is a function of automatically turning on and off the headlights and other lights according to the ambient brightness. If the driver wishes to manually control the lights, prohibition of automatic headlight-flashing can be used to comply with the driver's intention.

The vehicle control unit 14 may prohibit the automatic headlight-flashing when it is determined that the preceding vehicle is stopped in front of the own vehicle based on the detection result of the external sensor 1. The preceding vehicle may be, for example, another vehicle that is in front of the own vehicle and a certain distance from the own vehicle. The distance may be 0.5 m, may be 1 m, or may be 1.5 m. Alternatively, the preceding vehicle may be another vehicle whose own vehicle is an object of follow-up control. Accordingly, even if a two-wheeled vehicle or the like that is going through between the own vehicle and the preceding vehicle in a traffic jam is detected as an object body, it is not appropriate to perform headlight-flashing, and thus inappropriate automatic headlight-flashing can be avoided.

The vehicle control unit 14 may prohibit the automatic headlight-flashing when the traffic signal recognition unit 13 determines that the signaling state of the traffic signal in front of the own vehicle is the no-passage state. When the traffic signal in front of the own vehicle is in the no-passage state, it is not appropriate to perform the headlight-flashing even if an object body such as a pedestrian crossing the crosswalk in front of the vehicle is detected, so that inappropriate automatic headlight-flashing can be avoided.

Control Method of Vehicle Control Device

Figure 2:
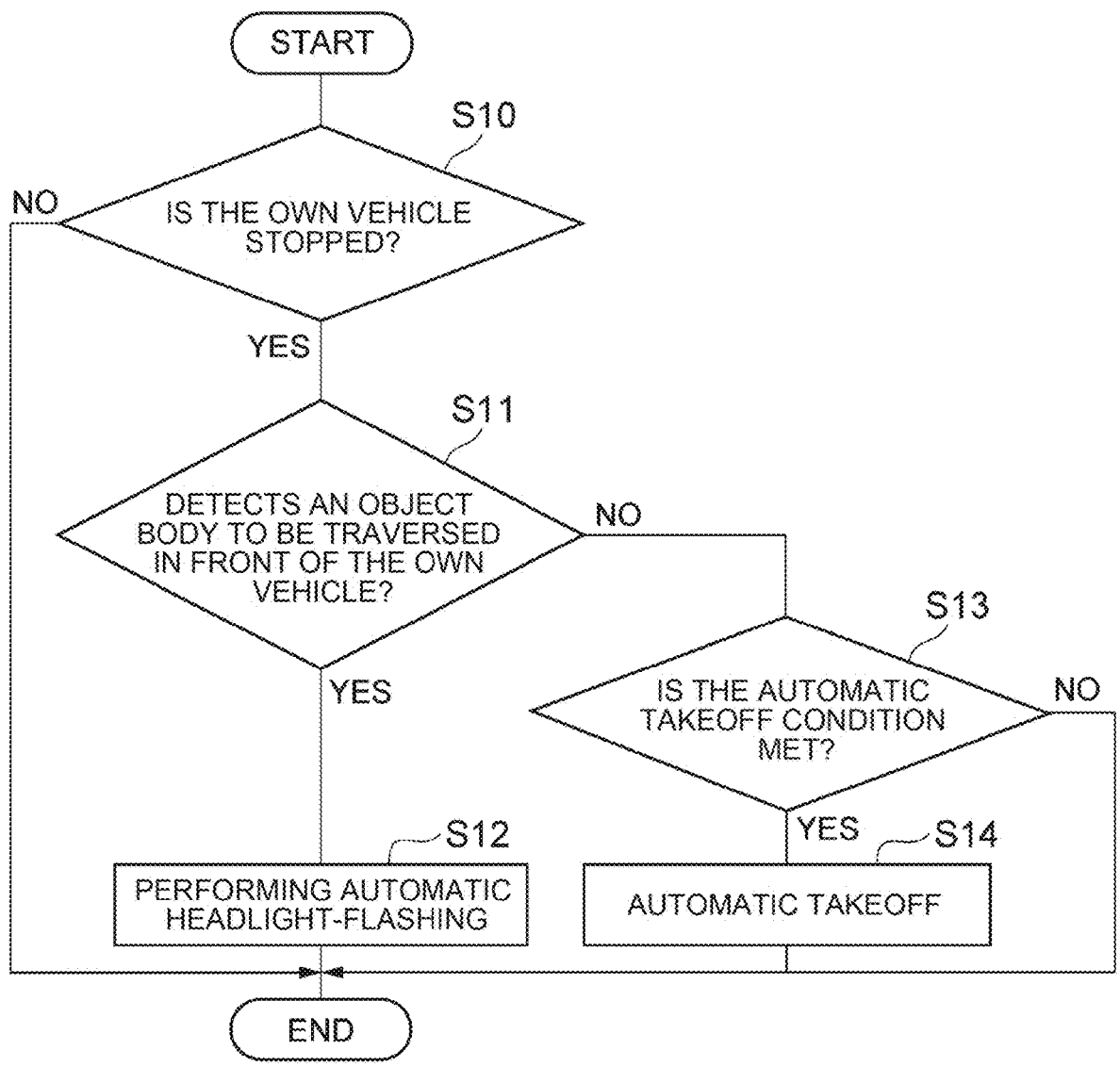
FIG. 2 is a flowchart illustrating an example of automatic takeoff control of the vehicle control device.

Next, a control method of the vehicle control device 100 according to the present embodiment will be described with reference to the drawings. FIG. 2 is a flowchart illustrating an example of the automatic takeoff control of the vehicle control device 100. The automatic takeoff control may be repeated at regular time intervals.

As illustrated in FIG. 2, the vehicle control ECU 10 of the vehicle control device 100 determines, as an S10, whether or not the own vehicle is stopped by the stop determination unit 11. When it is determined that the own vehicle is stopped (S10: YES), the vehicle control ECU 10 proceeds to S11. When it is not determined that the own vehicle is stopped (S10: NO), the vehicle control ECU 10 ends the present automatic takeoff control.

In S11, the vehicle control ECU 10 determines whether or not the object body determination unit 12 has detected an object body that is going to cross the front of the own vehicle. When it is determined that the object body is detected (S11: YES), the vehicle control ECU 10 proceeds to S12. If it is not determined that the object body has been detected (S11: NO), the vehicle control ECU 10 proceeds to S13.

In S12, the vehicle control ECU 10 executes automatic-headlight-flashing by the vehicle control unit 14. The vehicle control unit 14 transmits a control signal to the lighting device mechanism 4 to perform headlight-flashing by the headlight of the own vehicle. The vehicle control unit 14 suspends the automatic takeoff of the own vehicle without performing the automatic takeoff. Thereafter, the vehicle control ECU 10 ends the present automatic takeoff control. The vehicle control ECU 10 may repeat the process from S10 after the lapse of the set time without starting the automatic takeoff control until the preset set time elapses.

In S13, the vehicle control ECU 10 determines whether or not the automatic takeoff condition is satisfied by the vehicle control unit 14. When it is determined that the automatic takeoff condition is satisfied (S13: YES), the vehicle control ECU 10 proceeds to S14. When it is determined that the automatic takeoff condition is not satisfied (S13: NO), the vehicle control ECU 10 ends the present automatic takeoff control.

In S14, the vehicle control ECU 10 performs automatic takeoff the own vehicle by the vehicle control unit 14. The vehicle control unit 14 transmits a control signal to the drive mechanism 3 to execute automatic takeoff of the own vehicle. Thereafter, the vehicle control ECU 10 ends the present automatic takeoff control.

Next, the first automatic-headlight-flashing prohibition process will be described referring to FIG. 3A. FIG. 3A is a flow chart illustrating an example of a first automatic headlight-flashing prohibition process. The first automatic headlight-flashing prohibition process is executed when the automatic takeoff control of FIG. 2 is executable.

As illustrated in FIG. 3A, the vehicle control ECU 10 determines, as an S20, whether or not the auto-light function of the own vehicle is permitted by the vehicle control unit 14. When the auto-light function of the own vehicle is not permitted (S20: YES), the vehicle control ECU 10 proceeds to S21. When the auto-light function of the own vehicle is permitted (S20: NO), the vehicle control ECU 10 ends the first automatic-headlight-flashing prohibition process.

In S21, the vehicle control ECU 10 prohibits the automatic headlight-flashing by the vehicle control unit 14. The vehicle control unit 14 does not perform automatic headlight-flashing even when an object body is detected.

The second automatic-headlight-flashing prohibition process will be described referring to FIG. 3B. FIG. 3B is a flow chart illustrating an example of a second automatic headlight-flashing prohibition process. The second automatic headlight-flashing prohibition process is executed when the automatic takeoff control of FIG. 2 is executable.

As illustrated in FIG. 3B, the vehicle control ECU 10 determines, as an S30, whether or not the preceding vehicle is stopped by the vehicle control unit 14. When it is not determined that the preceding vehicle is stopped (S30: NO), the vehicle control ECU 10 proceeds to S31. When it is determined that the preceding vehicle is stopped (S30: YES), the vehicle control ECU 10 proceeds to S32.

In S31, the vehicle control ECU 10 determines whether or not the signaling state of the traffic signal in front of the own vehicle is the no-passage state by the traffic signal recognition unit 13. When the traffic signal does not exist within a certain distance in front of the own vehicle, it is determined that the signaling state of the traffic signal is not the no-passage state. When it is determined that the signaling state of the traffic signal is the no-passage state (S31: YES), the vehicle control ECU 10 proceeds to S32. When it is not determined that the signaling state of the traffic signal is the no-passage state (S31: NO), the vehicle control ECU 10 ends the second automatic-headlight-flashing prohibition process.

In S32, the vehicle control ECU 10 prohibits the automatic headlight-flashing by the vehicle control unit 14. The vehicle control unit 14 does not perform automatic headlight-flashing even when an object body is detected. The first automatic headlight-flashing prohibition process of FIG. 3A and the second automatic headlight-flashing prohibition process of FIG. 3B described above may be incorporated as part of the automatic takeoff control of FIG. 2.

According to the vehicle control device 100 according to the present embodiment described above, when an object body that is going to cross the front of the own vehicle being stopped is detected, headlight-flashing of the own vehicle is executed and automatic takeoff of the own vehicle is suspended. Thus, the behavior of the own vehicle can be conveyed to other vehicles and pedestrians in the surroundings, while reducing the burden on the driver, as compared to the driver performing the headlight-flashing operation.

In addition, in the vehicle control device 100, when the auto-light function of the own vehicle is not permitted, automatic headlight-flashing is prohibited. Accordingly, when the driver intends to manually control the lights by turning off the auto-light function, the driver can follow the intention of the driver without performing automatic headlight-flashing.

In addition, the vehicle control device 100 prohibits automatic headlight-flashing when it is determined that the preceding vehicle is stopped in front of the own vehicle. Thus, inappropriate automatic headlight-flashing can be avoided when a two-wheeled vehicle or the like that tries to pass through between the own vehicle and the preceding vehicle is detected as an object body in a traffic jam.

In addition, the vehicle control device 100 prohibits automatic headlight-flashing when it is determined that the signaling state of the traffic signal in front of the own vehicle is the no-passage state. Thus, inappropriate automatic headlight-flashing can be avoided when an object body such as a pedestrian crossing a crosswalk in front of the own vehicle stopped by a traffic signal is detected.

Although the embodiments of the present disclosure have been described above, the present disclosure is not limited to the above-described embodiments. The present disclosure may be embodied in various forms with various changes and modifications, including the above-described embodiments, based on the knowledge of those skilled in the art.

The vehicle control device 100 does not necessarily have to include the traffic signal recognition unit 13, and recognition of the traffic signal is not essential. The vehicle control device 100 does not necessarily need to restrict the automatic headlight-flashing function according to whether or not the auto-light function is permitted. The vehicle control device 100 does not necessarily need to restrict the automatic headlight-flashing function in accordance with whether or not the preceding vehicle is stopped.

What is claimed is:

1. A vehicle control device that is configured to execute automatic takeoff control for performing automatic takeoff of an own vehicle, the vehicle control device comprising:

an object body determination unit for determining whether an object body that is attempting to cross in front of the own vehicle has been detected, while the own vehicle is stopped;

a vehicle control unit that executes headlight-flashing of the own vehicle, and also suspends automatic takeoff of the own vehicle, when the object body is detected; and a traffic signal recognition unit that recognizes a signaling state of a traffic signal in front of the own vehicle while the own vehicle is stopped, wherein even when the object body is detected, the vehicle control unit does not execute headlight-flashing of the own vehicle when the signaling state of the traffic signal is a no-passage state.

2. The vehicle control device according to claim 1, wherein even when the object body is detected, the vehicle control unit does not perform headlight-flashing of the own vehicle when a preceding vehicle is stopped in front of the own vehicle.

3. The vehicle control device according to claim 1, wherein even when the object body is detected, the vehicle control unit does not execute headlight-flashing of the own vehicle when an auto-light function of the own vehicle is not permitted.

* * * * *